United States Patent
Filsfils et al.

(10) Patent No.: US 9,698,910 B2
(45) Date of Patent: *Jul. 4, 2017

(54) NETWORK SERVER LAYER PROVIDING DISJOINT CHANNELS IN RESPONSE TO CLIENT-LAYER DISJOINT PATH REQUESTS

(71) Applicants: Clarence Filsfils, Brussels (BE); Ornan Alexander Gerstel, Herzelia, IL (US); Gabriele Maria Galimberti, Bovisio Masciago (IT); Jean-Philippe Vasseur, Saint Martin d'Uriage (FR); David Delano Ward, Somerset, WI (US); Walid Wakim, Aurora, IL (US)

(72) Inventors: Clarence Filsfils, Brussels (BE); Ornan Alexander Gerstel, Herzelia, IL (US); Gabriele Maria Galimberti, Bovisio Masciago (IT); Jean-Philippe Vasseur, Saint Martin d'Uriage (FR); David Delano Ward, Somerset, WI (US); Walid Wakim, Aurora, IL (US)

(73) Assignee: Cisco Technology, Inc., San Jose, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,585

(22) Filed: May 31, 2015

(65) Prior Publication Data
US 2015/0263811 A1    Sep. 17, 2015

Related U.S. Application Data

(63) Continuation of application No. 13/801,667, filed on Mar. 13, 2013, now Pat. No. 9,049,266.

(51) Int. Cl.
*H04J 14/00* (2006.01)
*H04B 10/27* (2013.01)
(Continued)

(52) U.S. Cl.
CPC ............ *H04B 10/27* (2013.01); *H04B 10/25* (2013.01); *H04J 14/0267* (2013.01);
(Continued)

(58) Field of Classification Search
CPC ......... H04B 10/27–10/278; H04J 14/00; H04J 14/0227–14/0275; H04Q 11/00–11/08
(Continued)

(56) References Cited

U.S. PATENT DOCUMENTS 7,821,951 B2 * 10/2010 Douville ................ H04L 45/04
                                                                370/230
9,049,266 B2    6/2015 Filsfils et al.
(Continued)

OTHER PUBLICATIONS

Vasseur et al., "Path Computation Element (PCE) Communication Protocol (PCEP)," RFC 5440, The Internet Society, Reston, VA, USA, Mar. 2009 (eighty-seven pages).

*Primary Examiner* — Li Liu
(74) *Attorney, Agent, or Firm* — The Law Office of Kirk D. Williams

(57) ABSTRACT

In one embodiment, a network server layer provides disjoint channels in response to client-layer disjoint path requests. For example, the network layer can be an optical network, and the client layer may be a packet switching layer (e.g., label switching, Internet Protocol). In one embodiment, a server-layer node receives a client-layer disjoint path request to provide a server-layer channel through a server-layer network. The client-layer disjoint path request includes an identifier corresponding to an existing client-layer path that traverses a current channel through the server-layer network that does not include the server-layer node. The server-layer network determines a particular channel through the server-layer network that is disjoint to the current channel based on route information of the current channel, and then signaling
(Continued)

is performed within the server-layer network to establish the particular channel.

20 Claims, 5 Drawing Sheets

(51) Int. Cl.
    *H04L 29/06*     (2006.01)
    *H04L 12/54*     (2013.01)
    *H04L 12/723*     (2013.01)
    *H04J 14/02*     (2006.01)
    *H04L 12/735*     (2013.01)
    *H04B 10/25*     (2013.01)
    *H04Q 11/00*     (2006.01)

(52) U.S. Cl.
    CPC ........ *H04L 12/5689* (2013.01); *H04L 45/128* (2013.01); *H04L 45/50* (2013.01); *H04L 67/42* (2013.01); *H04Q 11/0005* (2013.01); *H04Q 11/0066* (2013.01); *H04Q 2011/0077* (2013.01)

(58) Field of Classification Search
    USPC ...................................... 398/5–103, 115–117
    See application file for complete search history.

(56) References Cited

U.S. PATENT DOCUMENTS

| | | | | |
|---|---|---|---|---|
| 2002/0109879 | A1* | 8/2002 | Wing So | H04J 7/00 398/58 |
| 2004/0172478 | A1* | 9/2004 | Jacobs | H04N 21/234327 709/233 |
| 2004/0205239 | A1* | 10/2004 | Doshi | H04J 14/0227 709/241 |
| 2005/0237950 | A1* | 10/2005 | Yuan | H04J 14/0227 370/255 |
| 2006/0126495 | A1* | 6/2006 | Guichard | H04L 12/2697 370/216 |
| 2006/0209682 | A1* | 9/2006 | Filsfils | H04L 45/04 370/219 |
| 2006/0262772 | A1* | 11/2006 | Guichard | H04L 43/0811 370/351 |
| 2008/0219272 | A1* | 9/2008 | Novello | H04L 47/11 370/401 |
| 2009/0103442 | A1* | 4/2009 | Douville | H04L 45/04 370/248 |
| 2009/0225675 | A1* | 9/2009 | Baum | H04L 12/4641 370/252 |
| 2012/0221624 | A1 | 8/2012 | Gerstel et al. | |
| 2013/0202299 | A1* | 8/2013 | Prakash | H04J 14/0257 398/51 |
| 2013/0259472 | A1* | 10/2013 | Gebhard | H04L 45/38 398/45 |

* cited by examiner

NETWORK SERVER LAYER PROVIDING DISJOINT CHANNELS IN RESPONSE TO CLIENT-LAYER DISJOINT PATH REQUESTS

CROSS-REFERENCE TO RELATED APPLICATIONS

This application is a continuation of U.S. patent application Ser. No. 13/801,667, filed Mar. 13, 2013, which is hereby incorporated by reference in its entirety.

TECHNICAL FIELD

The present disclosure relates generally to communicating information, such as in packets, in a multi-layer communications network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Reliably and efficiently communicating information in a network is important. Different techniques may be employed in a network to communicate information in a network when the topology of the network changes and/or when communications resources become available.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
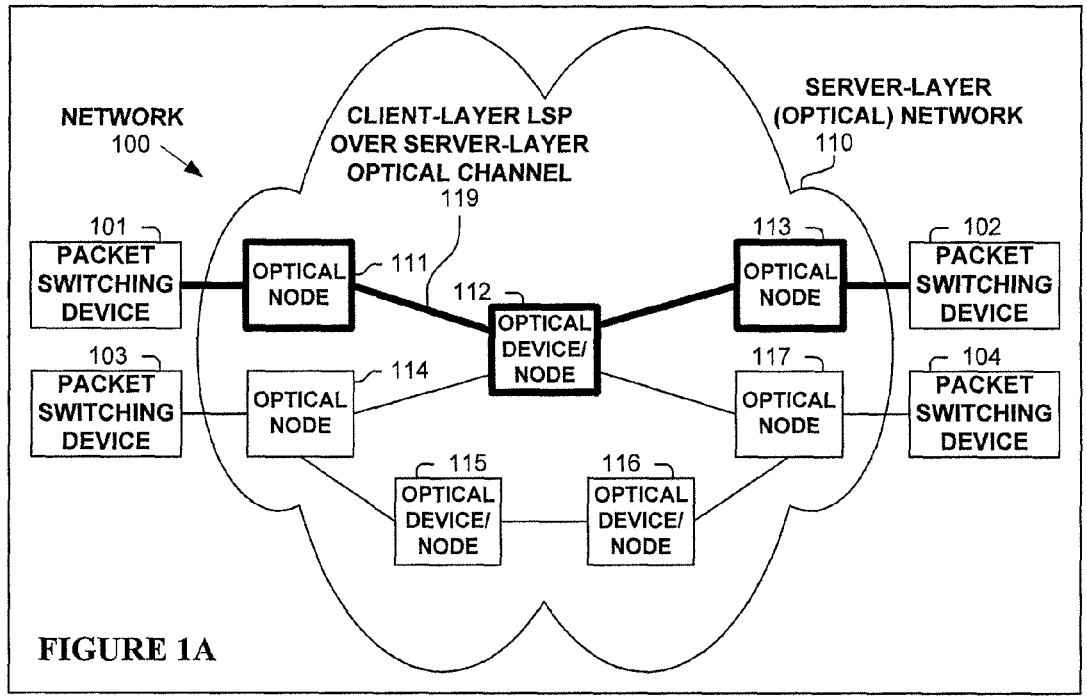
FIGS. 1A-C illustrate a network operating according to one embodiment.

Disclosed are, inter alia, methods, apparatus, computer-storage media, mechanisms, and means associated with a network server layer providing disjoint channels in response to client-layer disjoint path requests.

In one embodiment, a server-layer node receives a client-layer disjoint path request to provide a server-layer channel through a server-layer network. The client-layer disjoint path request includes an identifier corresponding to an existing client-layer path that traverses a current channel through the server-layer network that does not include the server-layer node. The server-layer network determines a particular channel through the server-layer network that is disjoint to the current channel based on route information of the current channel, and then signaling is performed within the server-layer network to establish the particular channel.

In one embodiment, in response to receiving a disjoint label switched path (LSP) request for a new LSP to be carried through an optical network over a new channel that is disjoint from an existing channel carrying a current LSP, an optical node determines the new channel through the optical network that is disjoint to the current channel based on route information through the optical network related to the current channel, wherein the existing channel is not terminated on the optical node. Signaling is performed in the optical network to establish the particular channel.

2. Description

Disclosed are, inter alia, methods, apparatus, computer-storage media, mechanisms, and means associated with a network server layer providing disjoint channels in response to client-layer disjoint path requests. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing said read value—the value is obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment includes, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

As used herein, a server-layer Shared Risk Link Group (SRLG) refers to a set of one or more things in the server network that will fail together, with these things being links, devices, nodes, etc. For example, an SRLG may be a device, such as a switch, repeater, regenerator, link, etc. Two links that traverse a same single point of failure (e.g., are wavelengths within a same fiber, are in different fibers that are co-located such as within a same conduit, or run under a same building such as they would both fail upon building collapse).

One embodiment includes a method, comprising: receiving, by a server-layer node, a client-layer disjoint path request to provide a server-layer channel through a server-layer network, with the client-layer disjoint path request including an identifier corresponding to an existing client-layer path that traverses a current channel through the server-layer network that does not include the server-layer node; determining, by the server-layer network, a particular channel through the server-layer network that is disjoint to the current channel based on route information of the current channel; and signaling within the server-layer network to establish the particular channel.

One embodiment includes requesting and receiving by the server-layer node from a second server-layer node in the server-layer network said route information of the current channel. In one embodiment, the current channel is terminated at the server-layer by the second server-layer node. In one embodiment, the identifier is a channel identifier including an identification of the second server-layer node. In one embodiment, the identifier is a channel identifier including an identification of the second server-layer node. One embodiment includes: subsequent to the particular channel being established, sending by the server-layer node one or more messages to the second server-layer node identification information concerning the particular channel to be associated by the second-layer node with the current channel. In one embodiment, said one or more messages are unicast messages between the server-layer node and the second server-layer node.

In one embodiment, said determining, by the server-layer network, the particular channel through the server-layer network that is disjoint to the current channel based on route information of the current channel is performed by the server-layer node. In one embodiment, said determining, by the server-layer network, the particular channel through the server-layer network that is disjoint to the current channel based on route information of the current channel is performed on a node-by-node basis within the server-layer network. One embodiment includes: receiving, by the server-layer node, one or more server-layer network route advertisement messages communicating that the current channel is terminated at the server-layer by the second server-layer node.

One embodiment includes: receiving, by the server-layer node, one or more server-layer network route advertisement messages communicating said route information of the current channel. One embodiment includes: maintaining, by the server-layer node, a server-layer database including said route information of the current channel; and wherein said determining the particular channel includes retrieving said route information from the server-layer database. One embodiment includes: subsequent to the particular channel being established, sending by the server-layer node one or more server-layer advertisement messages to be received by the second server-layer node and including identification information concerning the particular channel to be associated with the current channel.

In one embodiment, the server-layer is an optical network layer. In one embodiment, the client-layer is Layer 3. In one embodiment, the client-layer path is a label switched path; and wherein the client-layer disjoint path request is for a second label switched path.

One embodiment includes a method, comprising: in response to receiving a disjoint label switched path (LSP) request for a new LSP to be carried through an optical network over a new channel that is disjoint from an existing channel carrying a current LSP, an optical node determining the new channel through the optical network that is disjoint to the current channel based on route information through the optical network related to the current channel, wherein the existing channel is not terminated on the optical node; and signaling in the optical network to establish the particular channel.

In one embodiment, the current channel is terminated in the optical network by a second optical node; and wherein the method includes: requesting, by the optical node, said route information from the second optical node, and subsequently receiving, by the optical node, said route information. One embodiment includes: receiving, by the optical node, one or more optical network route advertisement messages communicating said route information of the current channel.

One embodiment includes an optical node, comprising: one or more processing elements; memory; and a plurality of optical interfaces configured to send and receive packets. In one embodiment, said one or more processing elements are configured to perform operations, including: in response to receiving a disjoint label switched path (LSP) request for a new LSP to be carried through an optical network over a new channel that is disjoint from an existing channel carrying a current LSP, the optical node determining the new channel through the optical network that is disjoint to the current channel based on route information through the optical network related to the current channel, wherein the existing channel is not terminated on the optical node; and signaling in the optical network to establish the particular channel In one embodiment, the current channel is terminated in the optical network by a second optical node; and wherein the method includes: requesting, by the optical node, said route information from the second optical node, and subsequently receiving, by the optical node, said route information.

Expressly turning to the figures, FIG. 1A illustrates a network 100 operating according to one embodiment. Shown is a server-layer network 100 (e.g., optical network, non-packet switched network) including optical nodes/devices 111-117. The use of the phrase "nodes/devices" is to indicate that some of these appliances may include a processing capability (e.g., an optical node) or an optical device (e.g., optical regenerators, cross-connects, transponders). A client-layer network is shown including packet switching devices 101-104.

As illustrated in FIG. 1A, a client-layer path (in this example a label switched path or LSP) is established over an (end-to-end) optical channel 119 through optical network 110, that goes through optical nodes/devices 111, 112 and 113. This optical channel is terminated on optical nodes 111 and 113. In one embodiment, optical node 111 initiated the establishment of this optical channel 119; thus, it has a list of links and nodes (sometimes referred to as an explicit route object or ERO) in the optical network that optical channel 119 traverses.

Figure 1B:
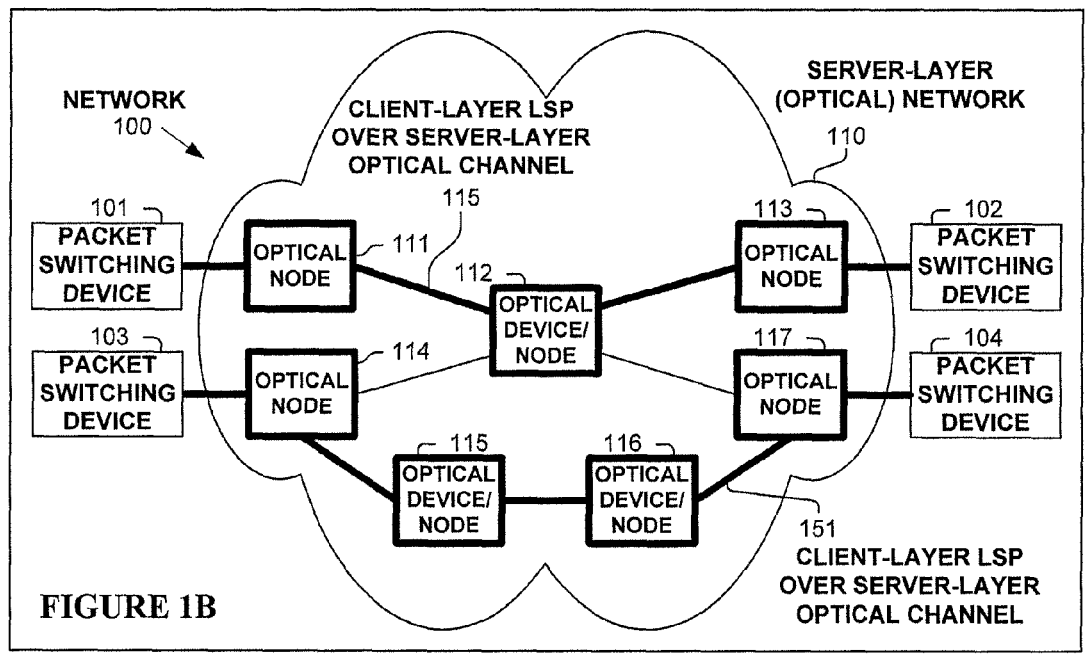

In one embodiment and turning to FIG. 1B, packet switching device 103 (e.g., a client device) requests that optical node 114 establish an optical channel through optical network 110 to carry a particular label switched path (LSP) that is disjoint from LSP 119 that traverses optical network 110. As LSP neither traverse nor terminates on optical node 114, optical node 114 needs to acquire information concerning the end-to-end channel through optical network 110 taken by LSP 115.

In one embodiment, optical node 114 receives a channel identifier corresponding to LSP as part of the disjoint path request from packet switching device 103, which learned of this information as the client-layer network floods this information using a routing or other network information distribution protocol. In one embodiment, the channel identifier includes information such as an identification of the LSP, an address of the originating server-layer node (e.g., that node will have the complete path information), and a server-layer channel identifier identifying that channel through the server-layer network. In one embodiment, the channel identifier includes an address of the other end node of the path through the server network (e.g., the end node that is not the originating server-layer node). Based on this channel identifier, optical node 114 requests and receives the ERO of the optical channel that carries LSP 115. Therefore, optical node 114 now has a list of links, nodes, devices, shared link risk groups, etc. that it must avoid. In one embodiment, rather than having to request the ERO, when a server-layer channel is created, the ERO of a new channel is flooded by the originating server-layer node through the server network, and server-layer nodes maintain this information. In one embodiment, a channel identifier is flooded by the originating server-layer node through the server network in addition to, or in place of, the ERO.

After acquiring the ERO (e.g., after requesting or retrieving from a data structure), optical node 114 determines a new path (151) through optical network that is disjoint from the optical channel 115, with new path 151 shown in FIG. 1B to traverse optical nodes/devices 114, 115, 116, and 117.

Figure 1C:
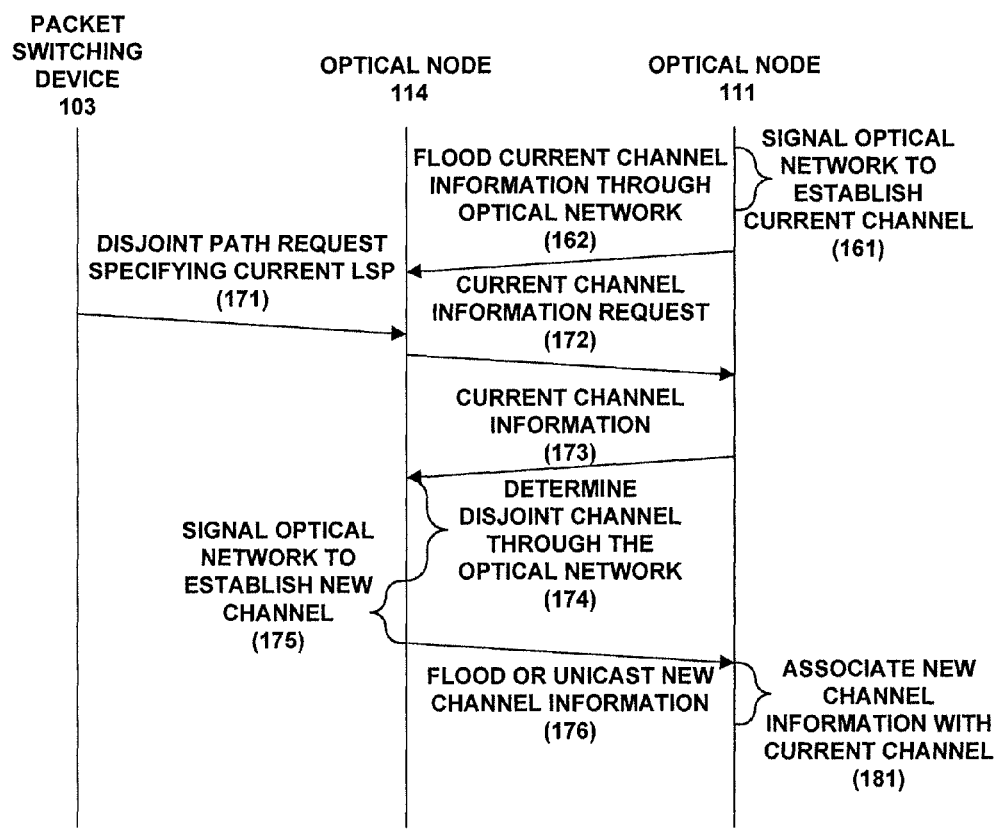

FIG. 1C illustrates one or more processes performed in one embodiment, such as in conjunction with network 100 of FIGS. 1A and 1B. First, a current channel through the optical network is established by optical node 111, including by signaling (161) through the optical network. Client-layer traffic is then transported across this client-layer path over this current optical channel. Packet switching device 103 receives information concerning the topology of this channel in the client-layer network, as well as limited typically information (e.g., a channel identifier) that includes an address of a server-layer node associated with the server-layer channel (e.g., an Internet Protocol (IP) address of the originating server-layer node).

Subsequent to the establishment of the current channel, packet switching device 103 communicates (171) a disjoint path request specifying the channel identifier of the current client-layer path (e.g., LSP). In this embodiment, this channel identifier includes: an identification of the LSP, a specification of an IP address of originating optical node 111, and an identification of the optical channel that carries the LSP.

Optical node 114, based on this request and the received channel identifier, requests (172) and receives (173) from the current channel's originating optical node 111 current channel information (e.g., ERO or some other specification of resources and/or SRLG's associated therewith). Optical node 114 determines (174) a new channel through the network that is disjoint from the current channel (e.g., does not use the same resources and/or SRLG's associated therewith). Optical node 114 signals (175) to the optical network to establish this new channel. Optical node 114 sends (e.g., unicasts/sends addressed to) optical node 111 information (e.g., a channel identifier) of the disjoint new optical channel. Optical node 111 associates (181) this disjoint property of the new optical channel with that of the current optical channel, as any reconfiguration or reoptimization of the current optical channel should maintain the disjoint property with the new optical channel.

Figure 2A:
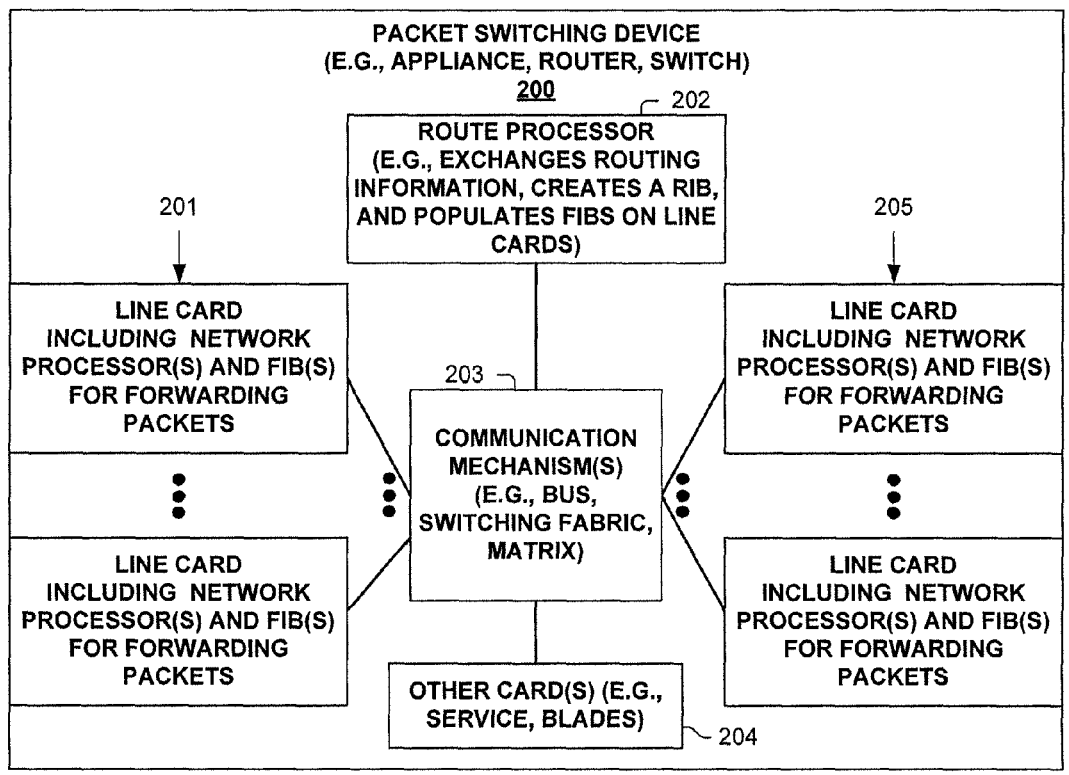
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links (e.g., over optical links to an optical network), and with one or more processing elements that are used in one embodiment associated with a network server layer providing disjoint channels in response to client-layer disjoint path requests. Packet switching device 200 also has a control plane with one or more processing elements 202 for managing the control plane and/or control plane processing of packets associated with a network server layer providing disjoint channels in response to client-layer disjoint path requests. Packet switching device 200 also includes other cards 204 (e.g., service cards, blades) which include processing elements that are used in one embodiment to process packets associated with a network server layer providing disjoint channels in response to client-layer disjoint path requests, and some communication mechanism 203 (e.g., bus, switching fabric, matrix) for allowing its different entities 201, 202, 204 and 205 to communicate.

Figure 2B:
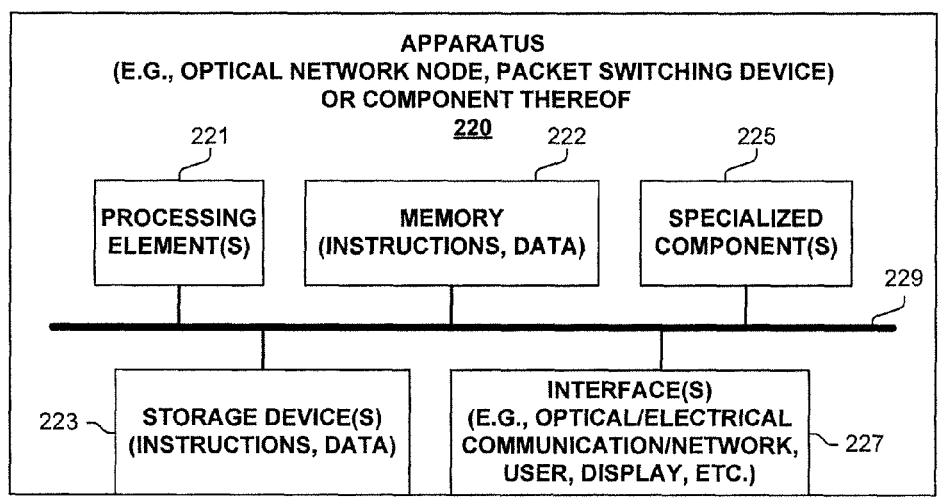
FIG. 2B illustrates an apparatus (e.g., optical node) according to one embodiment.

FIG. 2B is a block diagram of an apparatus 220 used in one embodiment associated with a network server layer providing disjoint channels in response to client-layer disjoint path requests. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221, memory 222, storage device(s) 223, specialized component(s) 225 (e.g. optimized hardware such as for performing lookup and/or packet processing operations, etc.), and optical and/or electrical interface(s)

227 for communicating information (e.g., sending and receiving packets, user-interfaces, displaying information, etc.), which are typically communicatively coupled via one or more communications mechanisms 229, with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Figure 3:
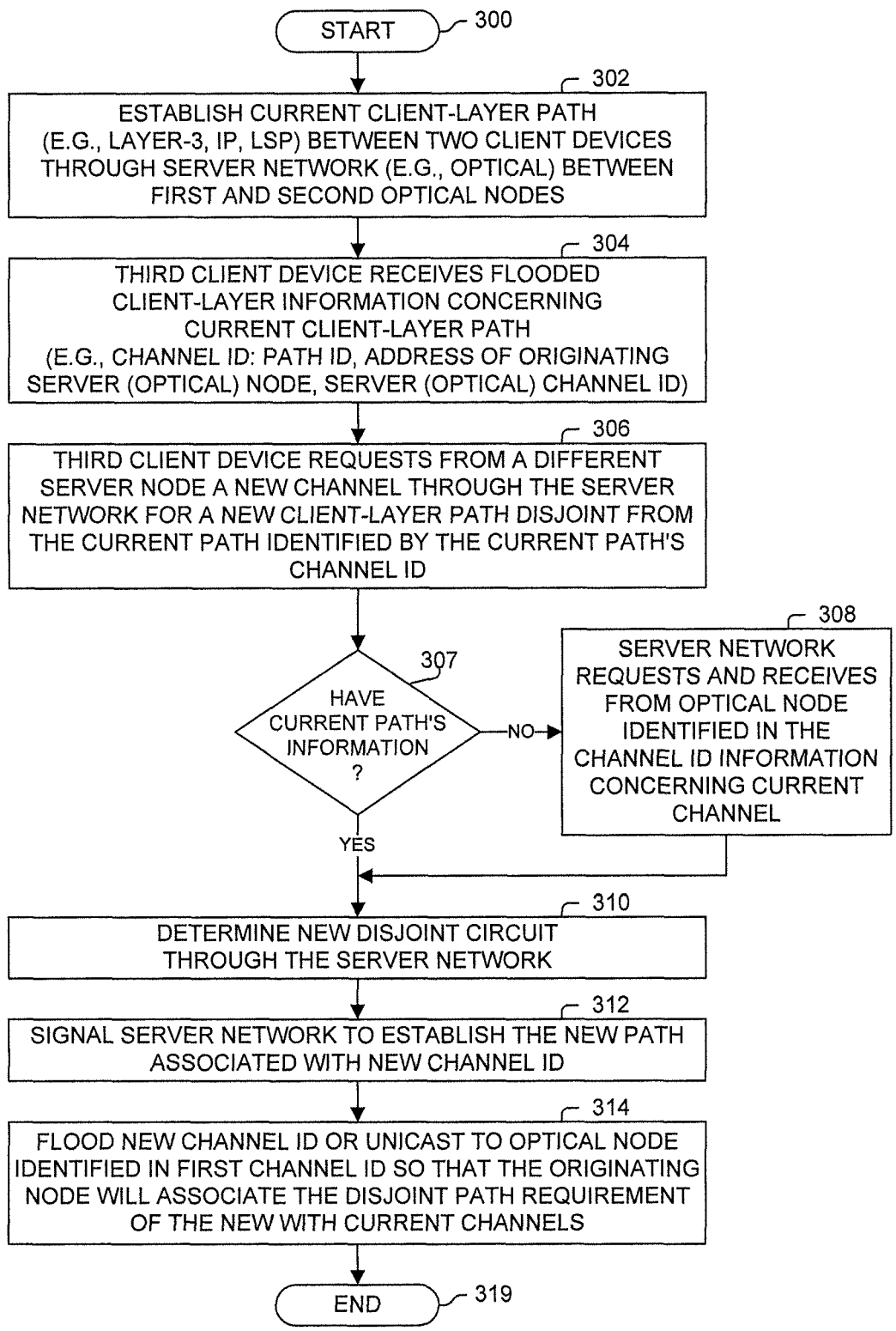
FIG. 3 illustrates a process according to one embodiment.

FIG. 3 illustrates a process performed in one embodiment. Processing begins with process block 300. In process block 302, a current client-layer path (e.g., Layer-3, IP, LSP) between two client-layer devices is established, including using a current circuit through a server network (e.g., optical network) between first and second optical nodes. In process block 304, a third client device receives flooded client-layer information concerning the current client-layer path (e.g., including a circuit identifier relating the client-layer path to the server-layer circuit).

In process block 306, the third client device requests, from a different server node, a new channel through the server network for a new client-layer path disjoint from the current path through the server network identified by the current path's channel identifier.

As determined in process block 307, if the new server node has the information (e.g., ERO) about the resources and/or SRLGs associated with the current path (e.g., they were flooded through the network after the circuit was established and maintained in a data structure in the new server node), then processing proceeds to process block 310. Otherwise, this information is acquired by the new server node by requesting it from the server node identified in the current path's channel identifier.

Next, in process block 310, the new server node determines (e.g., itself or possibly in communication with a network management or other device) a new disjoint circuit through the server network. In process block 312, the new server node signals to the server network to establish the new circuit, disjoint from the current circuit. In process block 314, a channel identifier associated with the new server-layer circuit and client-layer path is either flooded through the server network or unicast and received by the server node identified in the current path's channel identifier, so that it can update its data structure that the current circuit should be disjoint from the new circuit (e.g., in case of reoptimization). Processing of the flow diagram of FIG. 3 is complete as indicated by process block 319.

Figure 4:
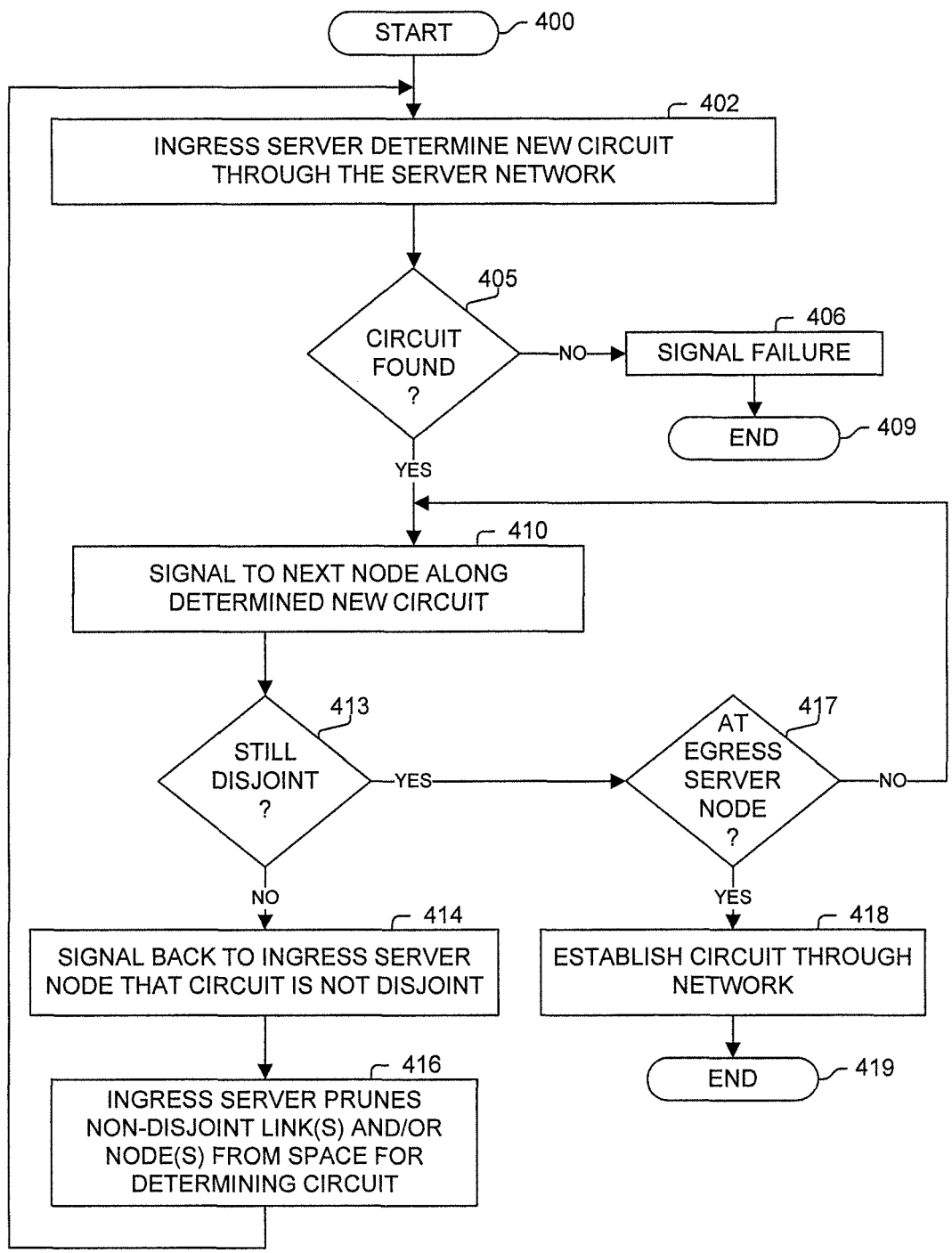
FIG. 4 illustrates a process performed on a node-by-node basis according to one embodiment.

FIG. 4 illustrates a process performed on a node-by-node basis according to one embodiment. In one embodiment, the processing of FIG. 4 corresponds to the processing of process blocks 310-312 of FIG. 3.

Processing begins with process block 400. In process block 402, an ingress server node determines a new circuit through the server-layer network corresponding to a received request (e.g., such as, but not limited to, in process block 306-308 of FIG. 3). As determined in process block 405, if a circuit (e.g., an optical light path between an ingress optical node and an egress optical node through an optical network in one embodiment) is found, then in process block 410, the next node along this circuit is signaled with the current client-layer path information. As determined in process block 413, if this path is still disjoint from the current client-layer path (e.g., disjoint to a circuit portion of the server-layer network on which the current path resides determined based on comparing the received current client-layer path information with a data structure including information about current paths for which it is currently providing resources), then processing proceeds to process block 417. If the current node is not the egress server-layer node, then processing returns to process block 410 to signal the next node (e.g., to continue the determination, by the server-layer network, the channel through the server-layer network on a node-by-node basis). Otherwise, as determined in process block 417 that the current node is the egress server-layer node, then in process block 418, the disjoint circuit is established through the server-layer network (e.g., using Resource Reservation Protocol (RSVP) signaling in the reverse direction along the path taken through the server-layer network); and processing of the flow diagram of FIG. 4 is complete as indicated by process block 419.

Otherwise, as determined in process block 413, the circuit is not disjoint to the current path (e.g., not disjoint to a circuit portion of the server-layer network on which the current path resides determined based on comparing the received current client-layer path information with a data structure including information about current paths for which it is currently providing resources). Then, in process block 414, the ingress server-layer node is signaled that that circuit is not disjoint. The server-layer node prunes non-disjoint resources (e.g., SRLG, links and/or the server-layer node that determined the circuit was not disjoint) from the space of network resources on which it is determining the circuit; and processing returns to process block 402.

If in process block 405, a determination is made that there is no disjoint circuit through the server-layer network, then in process block 406, failure is signaled (e.g., to the requesting client-layer node and/or to an operations/network management system indicating an alarm/warning/informational message). Processing of the flow diagram of FIG. 4 is complete as indicated by process block 409.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   receiving, by an optical-layer ingress server of an optical network, a client-layer disjoint path request to provide an optical circuit through the optical network that is disjoint to a particular existing client-layer path that traverses an existing optical circuit through the optical network;
   initiating, by the optical-layer ingress server, a first new circuit through the optical network to be disjoint to the existing optical circuit through the optical network;
   determining, by a first optical node along the first new circuit, that the first new circuit is not disjoint to the existing optical circuit;
   sending, to the optical-layer ingress server by the first optical node, a first signal identifying that the first new circuit is not disjoint to the existing optical circuit;
   receiving, by the optical-layer ingress server, the first signal; and
   in response to said receiving the first signal, initiating, by the optical-layer ingress server, a second new circuit through the optical network to be disjoint to the existing optical circuit through the optical network.

2. The method of claim 1, wherein the second new circuit is established and is disjoint from the existing optical circuit.

3. The method of claim 2, comprising: determining, by a second optical node along the second new circuit, that the second new circuit is disjoint to the existing optical circuit.

4. The method of claim 2, comprising in response to determining, by a second optical node along the second new circuit, that the second new circuit is disjoint to the existing optical circuit: signaling to a third optical node along the second new circuit in establishing the second new circuit.

5. The method of claim 2, comprising: in response to receiving the first signal, pruning one or more non-disjoint links associated with the first new circuit or one or more non-disjoint nodes associated with the first new circuit from a search space of possible optical paths through the optical network that are disjoint to the existing optical circuit through the optical network.

6. The method of claim 5, comprising: determining, by the optical-layer ingress server, each of the first new circuit and the second new circuit based on a respective current state of the search space.

7. The method of claim 1, wherein said determining that the first new circuit is not disjoint to the existing optical circuit is performed as during the establishment phase of the first new circuit.

8. The method of claim 1, comprising:
   determining, by a second optical node along the second new circuit, that the second new circuit is not disjoint to the existing optical circuit;
   sending, to the optical-layer ingress server by the second optical node, a second signal identifying that the second new circuit is not disjoint to the existing optical circuit;
   receiving, by the optical-layer ingress server, the second signal; and
   in response to said receiving the second signal, initiating, by the optical-layer ingress server, a third new circuit through the optical network to be disjoint to the existing optical circuit through the optical network.

9. The method of claim 8, wherein the third new circuit is established and is disjoint from the existing optical circuit.

10. The method of claim 1, comprising: in response to receiving the first signal, pruning one or more non-disjoint links associated with the first new circuit or one or more non-disjoint nodes associated with the first new circuit from a search space of possible optical paths through the optical network that are disjoint to the existing optical circuit through the optical network.

11. The method of claim 10, comprising: determining, by the optical-layer ingress server, each of the first new circuit and the second new circuit based on a respective current state of the search space.

12. The method of claim 1, wherein the client-layer disjoint path request is for a label switched path.

13. A method, comprising:
    receiving, by an optical-layer ingress server of an optical network, a client-layer disjoint path request to provide an optical circuit through the optical network that is disjoint to a particular existing client-layer path that traverses an existing optical circuit through the optical network;
    initiating, by the optical-layer ingress server, a first new circuit through the optical network to be disjoint to the existing optical circuit through the optical network;
    receiving, by the optical-layer ingress server, a signal identifying that the first new circuit was not disjoint to the existing optical circuit; and
    in response to said receiving the signal, initiating, by the optical-layer ingress server, a second new circuit through the optical network to be disjoint to the existing optical circuit through the optical network.

14. The method of claim 13, comprising: in response to receiving the signal identifying that the first new circuit was not disjoint to the existing optical circuit, pruning one or more non-disjoint links or one or more non-disjoint nodes from a search space of possible optical paths through the optical network that are disjoint to the existing optical circuit through the optical network.

15. The method of claim 14, comprising: determining, by the optical-layer ingress server, each of the first and second new circuits based on a respective current state of the search space.

16. An optical-layer ingress server, comprising:
    one or more processing elements;
    memory; and
    a plurality of optical interfaces that send and receive packets;
    wherein the optical-layer ingress server performs operations, including in response to a client-layer disjoint path request to provide an optical circuit through the optical network that is disjoint to a particular existing client-layer path that traverses an existing optical circuit through the optical network:
    initiating a first new circuit through the optical network to be disjoint to the existing optical circuit through the optical network;
    receiving a signal identifying that the first new circuit was not disjoint to the existing optical circuit; and
    in response to said receiving the signal, initiating a second new circuit through the optical network to be disjoint to the existing optical circuit through the optical network.

17. The optical-layer ingress server of claim 16, where said operations include: in response to receiving the signal identifying that the first new circuit was not disjoint to the existing optical circuit, pruning one or more non-disjoint links or one or more non-disjoint nodes from a search space of possible optical paths through the optical network that are disjoint to the existing optical circuit through the optical network.

18. The optical-layer ingress server of claim 17, where said operations include determining each of the first and second new circuits based on a respective current state of the search space.

19. A method, comprising:
receiving, by an optical node, a client-layer disjoint path request to provide an optical circuit through an optical network, with the client-layer disjoint path request including an identifier corresponding to an existing client-layer path that traverses a current optical circuit through the optical network;
receiving by the optical node from a second optical node in the optical network route information of the current optical circuit;
determining, by the optical node, a particular optical circuit through the optical network that is disjoint to the current circuit based on said received route information of the current circuit; and
signaling within the optical network to establish the particular circuit.

20. The method of claim 19, comprising signaling within the optical network information concerning the establishment of the particular circuit.

* * * * *